(12) United States Patent
Hashizume et al.

(10) Patent No.: US 12,545,378 B2
(45) Date of Patent: Feb. 10, 2026

(54) SYSTEM FOR SWITCHING SENSORS WHEN MOORING TO BERTH HAVING ROOF

(71) Applicant: Honda Motor Co., Ltd., Tokyo (JP)

(72) Inventors: Takashi Hashizume, Saitama (JP); Ryuichi Kimata, Tokyo (JP); Ryota Hisada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 17/956,839

(22) Filed: Sep. 30, 2022

(65) Prior Publication Data

US 2024/0109627 A1  Apr. 4, 2024

(51) Int. Cl.
*B63B 79/40* (2020.01)
*B63B 21/00* (2006.01)
*B63B 49/00* (2006.01)
*G05D 1/00* (2024.01)

(52) U.S. Cl.
CPC .............. *B63B 79/40* (2020.01); *B63B 21/00* (2013.01); *B63B 49/00* (2013.01); *G05D 1/0077* (2013.01); *G05D 1/0206* (2013.01)

(58) Field of Classification Search
CPC ......... B63B 79/40; B63B 21/00; B63B 49/00; G05D 1/077; G05D 1/0206; G05D 2109/34; G05D 2111/10; G05D 1/243; G05D 1/248; G05D 1/661; G05D 1/0077; G05D 2107/84

USPC ................................ 701/25; 114/361; 901/1
See application file for complete search history.

(56) References Cited

U.S. PATENT DOCUMENTS

| 11,167,833 | B2 | 11/2021 | Akuzawa et al. |
| 2010/0114537 | A1* | 5/2010 | Pershing .................. G06T 11/60 703/1 |
| 2011/0279673 | A1* | 11/2011 | Teich ...................... H04N 23/20 348/148 |
| 2014/0161362 | A1* | 6/2014 | Cao ...................... G06F 18/2178 382/224 |
| 2017/0123073 | A1* | 5/2017 | Jakupi ..................... G01S 19/49 |
| 2021/0347449 | A1* | 11/2021 | Dake ....................... B63B 79/10 |
| 2022/0284609 | A1* | 9/2022 | Shree ........................ G06T 7/33 |
| 2024/0083548 | A1* | 3/2024 | Bestul ....................... B63B 3/48 |

* cited by examiner

*Primary Examiner* — Fadey S. Jabr
*Assistant Examiner* — Paula L Schneider
(74) *Attorney, Agent, or Firm* — JCIPRNET (57) ABSTRACT

A control system adapted for a boat having a first sensor including a GNSS receiver detecting a position of the boat, and a second sensor detecting the position of the boat is provided. The control system includes a control unit having a processor, configured to: switch a control mode of the control unit to an automatic docking mode; obtain roof information regarding whether a berth for mooring the boat includes a roof wherein when the control unit determines the berth for mooring the boat includes the roof, the control unit switches, at a predetermined timing, from the first sensor to the second sensor for determining the position of the boat.

17 Claims, 5 Drawing Sheets

SYSTEM FOR SWITCHING SENSORS WHEN MOORING TO BERTH HAVING ROOF

BACKGROUND OF THE DISCLOSURE

Technical Field

The disclosure relates to a system for switching sensors of a boat, and more specifically relates to the system for switching sensors of the boat when mooring to a berth having a roof.

Related Art

When a boat is moored to a berth (at for example a port, harbor, dock or the like), a roof may cover the berth to protect the boat from rain, sunshine and/or the like. However, the roof may prevent the GPS receiver disposed on the boat from receiving a signal from a GPS satellite. In more detail, the roof covering the berth may shield the GNSS signal transmitted from the GPS satellite, such that a position of the boat is unable to be determined based on the UPS signal.

For example, when the boat is being moored to the berth, the GPS signal may cut off and/or weaken when the GPS receiver disposed on the boat enters under the roof. Similarly, when the boat is to depart from the berth, the GPS signal may be cut off and/or weak since the GPS receiver is under the roof and the GPS signal is shielded/blocked by the roof, such that a position of the boat is unable to be determined based on the GPS signal.

Therefore, a system for detecting a position of the boat that is to be moored to a berth having a roof is needed.

SUMMARY

According to an embodiment of the disclosure, a control system adapted for a boat having a first sensor including a GNSS receiver detecting a position of the boat, and a second sensor detecting the position of the boat is provided. The control system includes a control unit having a processor, configured to: switch a control mode of the control unit to an automatic docking mode; obtain roof information regarding whether a berth for mooring the boat includes a roof, wherein when the control unit determines the berth for mooring the boat includes the roof, the control unit switches, at a predetermined timing, from the first sensor to the second sensor for determining the position of the boat.

BRIEF DESCRIPTION OF THE, DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
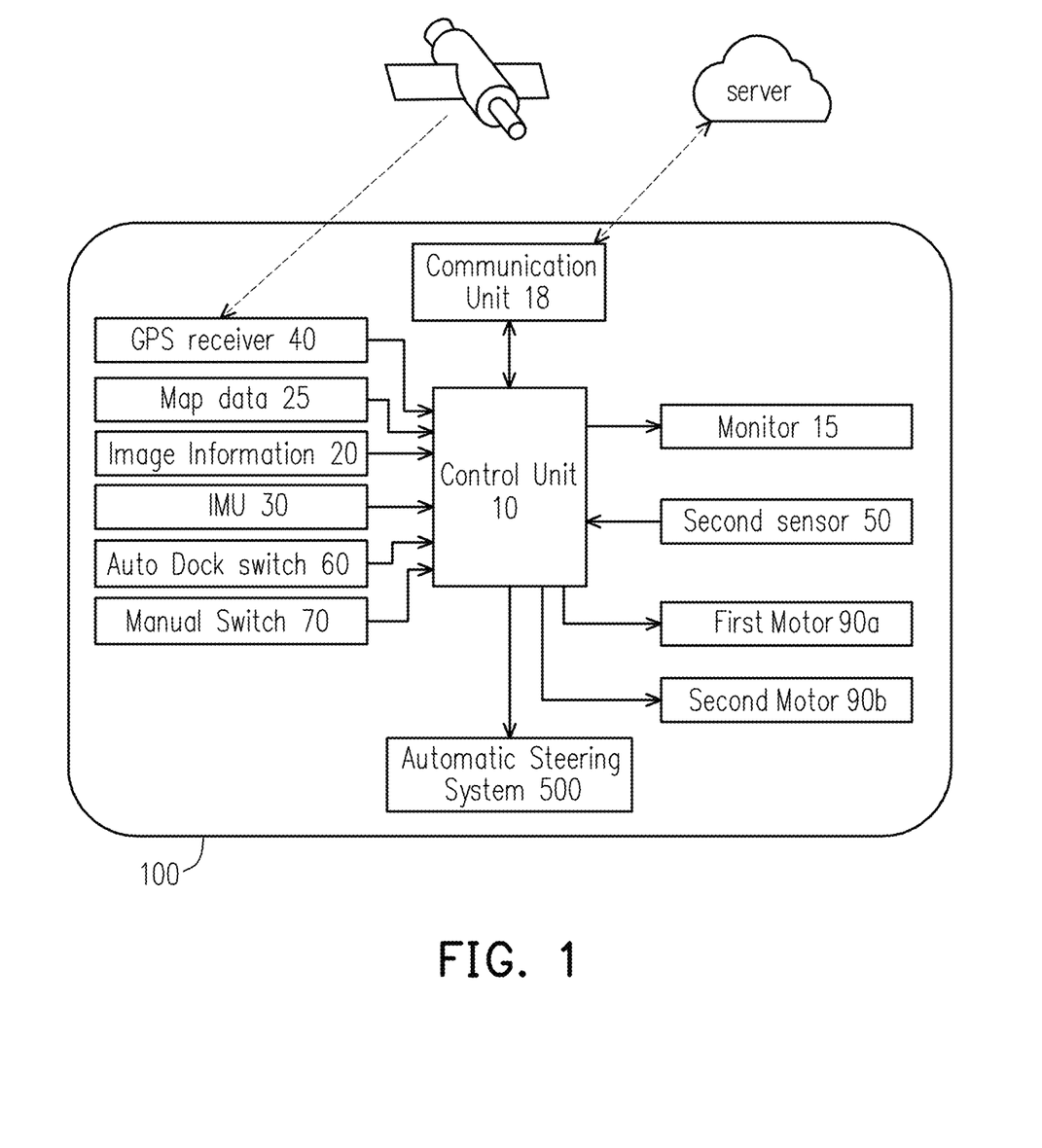
FIG. 1 is a schematic diagram illustrating a system for detecting a position of a boat that is moored under a roof according to an embodiment of the disclosure.

FIG. 1 is a schematic diagram illustrating a system for detecting a position of a boat that is moored under a roof according to an embodiment of the disclosure. Referring to FIG. 1, a boat 100 is provided. The boat 100 may be, for example, a water vessel, a water craft, a ship and/or the like. The boat 100 may be, for example, a speed boat, a catamaran, a pontoon and/or the like.

Referring to FIG. 1, a control unit 10 is disposed on the boat 100. The control unit 10 includes, for example, a processor and a memory. In addition, a monitor 15 and a communication unit 18 may be disposed on the boat 100. The communication unit 18 may include a transmitter and a receiver. The monitor 15 is an example of a display unit. The monitor 15 is coupled to the control unit 10, wherein the control unit 10 may display an image on the monitor 15. The control unit 10 may be configured to receive an input from a user via an input unit. The input unit may include, for example, a computer mouse and/or a keyboard. In another embodiment, the monitor 15 may include, for example, a capacitive touch screen to act as a touch screen to receive input from the user. For example, a map of a port may be displayed on the monitor 15, wherein a user may specify a location (a berth) on the map of the port to moor the boat 100 via the input unit. In this way, a position of the berth for mooring the boat 100 may be obtained by the control unit 10. In addition, a current position of the boat 100 may be displayed on the monitor 15.

The boat 100 includes a propulsion system, for example, a first motor 90a and a second motor 90b for propelling the boat 100 in water. The first motor 90a and/or the second motor 90b may be, for example, an inboard motor, an outboard motor, a partially inboard-partially outboard motor and the like. A first propeller is coupled to an output shaft of the first motor 90a and a second propeller is coupled to an output shaft of the second motor 90b, wherein the first motor 90a drives a rotation of the first propeller, and the second motor 90b drives a rotation of the second propeller. The first motor 90a and the second motor 90b are attached to a stern side of the boat 100. The first motor 90a and the second motor 90b may be a gasoline motor, an electric motor and the like and is not intended to limit the disclosure.

The boat 100 includes a steering system, for example, a steering wheel coupled to a rudder to steer a direction of the boat 100. The steering wheel may be coupled to the rudder by, for example, a cable or a wire or the like. The boat 100 further includes a manual driving mode and an automatic driving mode. An automatic docking mode is an example of an automatic driving mode. An automatic cruising mode is an example of an automatic driving mode. More specifically, the boat 100 includes an automatic steering system 500 for automatically driving/steering the boat in the automatic driving mode. In more detail, the boat 100 includes the automatic steering system 500 which may be used for automatically docking the boat 100 to a pier in the automatic docking mode. The control unit 10 is coupled to the automatic steering system 500, wherein the control unit 10 outputs (sends/transmits) control signals to the automatic steering system 500 to automatically drive the boat 100.

In more detail, the control unit 10 controls an automatic docking of the boat 100 via the automatic steering system 500. The control unit 10 may also determine an automatic docking route of the boat 100. In the present disclosure, docking may be used interchangeably with mooring, berthing and/or the like. That is to say, the control unit 10 controls an automatic docking, mooring and/or berthing of the boat 100 via the automatic steering system 500. The control unit 10 may also determine an automatic docking route, an automatic mooring route and/or an automatic berthing route of the boat 100.

The automatic steering system 500 may include, for example, sensors, switches and actuators and/or the like. For example, an actuator may be used for automatically turning the steering wheel. In another example, an actuator may be used for controlling the throttle. A switch may be used to switch the rotating direction of the motor to move forward or reverse. A sensor may be used to detect a position of the boat 100. A sensor(s) may be used for detecting objects in a surrounding of the boat 100.

Referring to FIG. 1, a user may switch an operation mode of the boat 100 to a manual driving mode by, for example, activating a manual switch 70. In addition the user may switch the operation mode of the boat 100 to an automatic docking mode by, for example, activating the auto dock switch 60. The auto dock switch 60 and the manual switch 70 may each be, for example, a physical push button, a touch button on an HMI (for example, the monitor 15 may be a capacitive touch screen) and/or the like. Each of the auto dock switch 60 and the manual switch 70 is an example of an input unit.

Referring to FIG. 1, when the user activates the auto dock switch 60, the control unit 10 is configured to switch a control mode of the control unit 10 to an automatic docking mode. When the control mode is switched to the automatic docking mode, the control unit 10 is configured to output a control signal to the automatic steering system 500 for controlling an automatic steering of the boat 100. When the control mode is switched to the manual driving mode, the control unit 10 is configured to not output the control signal for controlling the automatic steering of the boat 100, or to disengage the automatic steering system 500 of the boat 100 such that the boat 100 may be steered and/or controlled manually by the user.

Referring to FIG. 1, when the control mode of the control unit 10 is switched to the automatic docking mode via the auto dock switch 60, the control unit 10 is configured to output the control signal to the automatic steering system 500 to control an automatic steering of the boat 100 in accordance to the automatic mooring route calculated and/or set by the control unit 10.

In an embodiment of the disclosure, when the automatic docking of the boat 100 to the berth B is complete, the control unit 10 is configured to end the automatic docking mode by stopping the output of the control signal for controlling the automatic steering of the boat 100. In another embodiment of the disclosure, the control unit 10 is configured to end the automatic docking mode by not outputting the control signal for controlling the automatic steering of the boat 100. In another embodiment of the disclosure, the control unit 10 is configured to end the automatic docking mode by outputting a control signal to the automatic steering system 500 for stopping the automatic steering of the boat 100. In another embodiment of the disclosure, the control unit 10 is configured to end the automatic docking mode by disengaging the automatic steering system 500 of the boat 100 such that the boat 100 may be steered and/or controlled manually by the user. In another embodiment of the disclosure, the control unit 10 is configured to end the automatic docking mode by switching the control mode of the control unit 10 to another mode. The manual driving mode is an example of another mode.

Referring to FIG. 1, a GPS receiver 40 and an inertial measurement unit (IMU) 30 are coupled to the control unit 10. The GPS receiver 40 is an example of a Global Navigation Satellite System (GLASS) receiver. The GPS receiver 40 is an example of a first sensor of the disclosure. The GPS receiver 40 may include an antenna: The IMU 30 may include, for example, a gyroscope. The control unit 10 may obtain position coordinates of the boat 100 via the GPS receiver 40. That is to say, the GPS receiver 40 detects a position of the boat 100. The position coordinates may include, for example, the longitude and latitude coordinates of the boat 100. The control unit 10 may obtain an orientation or pointing direction of the boat 100 via the IMU 30.

Referring to FIG. 1, a second sensor 50 is disposed on the boat 100. The second sensor 50 may be, for example, a lidar, a sonar, a camera having an image sensor, and/or the like. However, the disclosure is not limited thereto. The second sensor 50 is coupled to the control unit 10. The second sensor 50 may be used to detect the position of the boat 100. For example, a surrounding environment of the boat 100 may be obtained from data obtained via the second sensor 50 (for example, from lidar data, sonar data, camera data). For example, objects in the surrounding environment of the boat 100 may be captured/detected by the camera (the second sensor 50). In another example, objects in the surrounding environment may be detected by the lidar (the second sensor 50). In another example, objects in the surrounding environment may be detected by the sonar (the second sensor 50). The objects in the surrounding environment of the boat 100 detected by the second sensor 50 may be, for example, a pier, a roof, other boats that are moored to the pier and/or the like. Then, the control unit 10 may determine the position of the boat 100 relative to the objects in the surrounding environment. The position of the boat 100 obtained from the second sensor 50 may be displayed on the monitor 15.

Lidar is an acronym for "light detection and ranging" or "laser imaging, detection, and ranging". The boat 100 may include the lidar for obtaining the lidar data/lidar image. The boat 100 may include the camera having an image sensor for obtaining the camera data/camera image. The boat 100 may include the sonar for obtaining the sonar data/sonar image.

Figure 2:
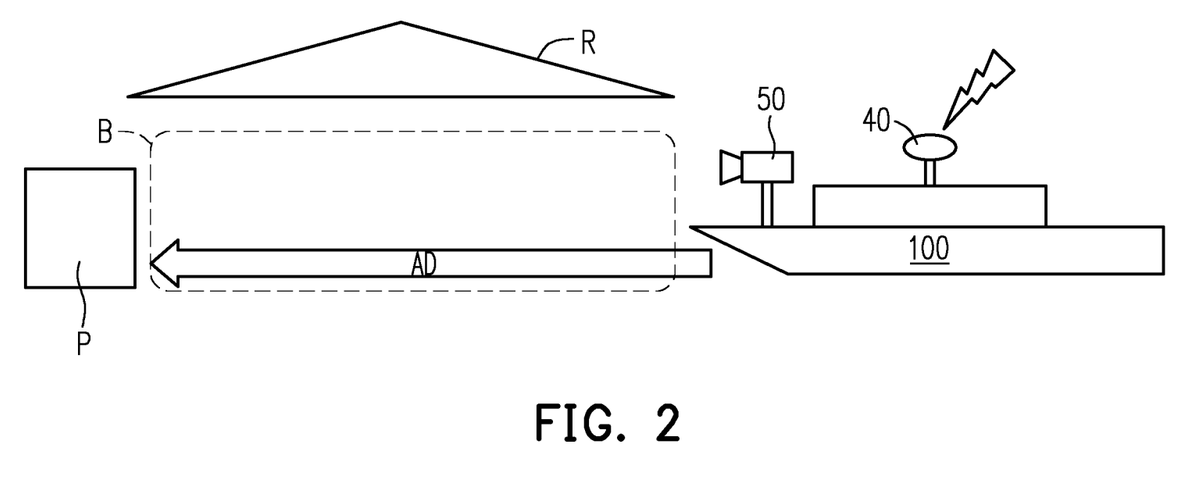
FIG. 2 is a schematic diagram illustrating a side view of a boat approaching a berth according to an embodiment of the disclosure.

FIG. 2 is a schematic diagram illustrating a side view of a boat approaching a berth at a pier according to an embodiment of the disclosure. Referring to FIG. 2, a roof R is disposed on top of a berth B. The roof R may be erected on top of a pier P. The boat 100 is to be moored at the berth B, and under the roof R.

Referring to FIG. 1, the control unit 10 obtains image information 20. The image information 20 is an example of a roof information of the disclosure. The roof information 20 includes information regarding whether the berth B for mooring the boat 100 includes the roof R.

In an embodiment of the disclosure, the image information 20 may be obtained from the second sensor 50 disposed on the boat 100. The control unit 10 may determine if the berth B includes the roof R from data obtained by the second sensor 50. For example, the control unit may determine if the berth B for mooring the boat 100 includes the roof R based on the image imaged by the camera, the sonar, the lidar and/or the like. The control unit 10 may include software for recognizing/identifying the roof R and/or a shape of the roof R from the image imaged by the second sensor.

In another embodiment, the roof information may be obtained without the second sensor 50. For example, a camera for obtaining the roof information 20 may be a camera that is not the second sensor CO. In another example, the roof information 20 may be obtained from map data 25 including the roof information. That is to say, the map data 25 is an example of the roof information of the disclosure. For example, the control unit 10 may obtain map data 25 from, for example, the internet, a database, a server and/or the like. The map data 25 may be stored in the memory of the control unit 10. The map data 25 may include a map of the pier P including the berth B to which the boat 100 is to be moored. The map data 25 may indicate whether the berth B is covered by the roof R. The control unit 10 may include software for recognizing/identifying the roof R and/or a shape of the roof R from the map data obtained by the control unit 10.

In another embodiment of the disclosure, the roof information may be Obtained from a satellite image including the roof information. The satellite image is an example of roof information of the disclosure. For example, the control unit 10 may obtain the satellite image from, for example, the internet, a database, a server and/or the like. The satellite image may include an image/map of the pier including the berth B to which the boat 100 is to be moored. The satellite image may indicate whether the berth B is covered by the roof R. The control unit may include software for recognizing/identifying the roof R and/or a shape of the roof R from the satellite image.

In another embodiment of the disclosure, the control unit 10 may obtain the roof information including a marker specifying the roof R. For example, a marker or a marking may be disposed on the roof R of the berth B, such that the roof R may be identified in the satellite image, the camera image, the image from the second sensor 50 and/or the like. The control unit may include software for recognizing/identifying the marker or marking specifying the roof R and/or a shape of the roof R.

In another embodiment of the disclosure, the control unit 10 may obtain the roof information by a user inputting the roof information to the control unit 10 via the input unit. For example, the user may input whether the berth. B includes the roof R and/or input a shape of the roof f.

Referring to FIG. 2, the control unit 10 determines whether the boat 100 is approaching the berth B or departing the berth B. The GPS receiver 40 is disposed on the boat 100. The approach direction AD of the boat 100 to the berth B is bow first. The control unit 10 may determine whether the boat 100 is approaching or departing the berth B based on, for example, the GPS data of the boat obtained from the GPS receiver 40 disposed on the boat 100. That is to say, a traveling direction of the boat 100 may be determined based on the GPS data obtained by the GPS receiver 40. It should be noted, the approach direction AD of the boat 100 to the berth B may be bow first or stern first, and is not intended to limit the disclosure.

Referring to FIG. 2, when the control unit 10 determines the berth B for mooring the boat B includes the roof R via the roof information 20 obtained by the control unit 10, the control unit 10 switches, at a predetermined timing T, from the first sensor 40 to the second sensor 50 for determining the position of the boat 100. That is to say, prior to the predetermined timing T, the control unit 10 uses the first sensor 40 to determine the position of the boat 100. Then, at and after the predetermined timing T, the control unit 10 switches from the first sensor 40 to the second sensor 50 to determine the position of the boat 100. In more detail, prior to the predetermined timing T, the control unit 10 uses the first sensor 40 to determine the position of the boat 100. Then, after the predetermined timing T, the control unit 10 uses the second sensor 50 to determine the position of the boat 100. By switching from the first sensor 40 to the second sensor 50 when the control unit 10 determines that the berth B for mooring the boat 100 includes the roof R, a situation where the GPS signal is cut off and/or weakened may be prevented. In this way, by switching to the second sensor 50 to determine the position of the boat 100, the control unit 10 may consistently and accurately detect the position of the boat 100 for the entirety of the auto docking operation even when the GPS signal obtained by the first sensor 40 may be cut off and/or weakened by the presence of the roof R.

Figure 3:
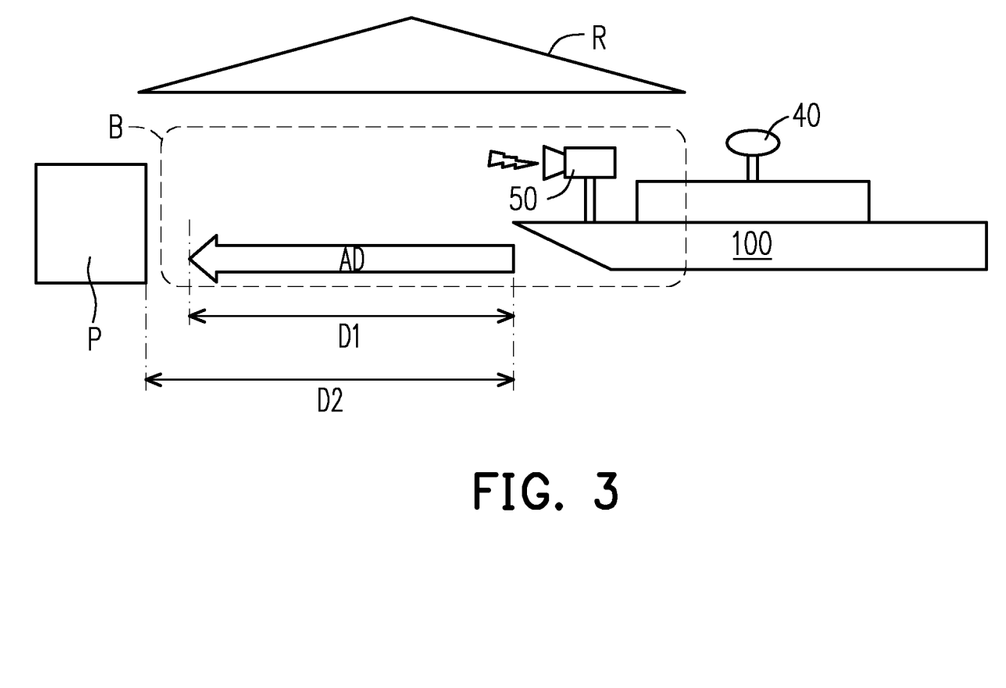
FIG. 3 is a schematic diagram illustrating a boat at a predetermined timing according to an embodiment of the disclosure.

FIG. 3 is a schematic diagram illustrating a boat at a predetermined timing according to an embodiment of the disclosure. Referring to FIG. 3, the predetermined timing T may be, for example, prior to (before) the first sensor 40 enters under the roof R. That is to say, the GPS signal detected by the first sensor 40 may be cut off and/or weaken after the first sensor 40 enters under the roof R, therefore the position of the boat 100 may be more accurately determined by switching from the first sensor 40 to the second sensor 50 before the GPS signal detected by the first sensor 40 is cut off and/or weakened. However, the disclosure is not limited thereto. In another embodiment of the disclosure, the predetermined timing T may be a timing after the first sensor 40 enters under the roof R.

Referring to FIG. 3, the predetermined tiding T for switching from the first sensor 40 to the second sensor 50 may be, for example, when a signal strength of the GPS signal detected/obtained by the first UPS receiver 40 is less than a predetermined threshold. That is to say, the positioning accuracy and/or reliability may decrease when the strength of the GPS signal is less than the predetermined threshold. Therefore, the position of the boat 100 may be more accurately and/or reliably determined by switching from the first sensor 40 to the second sensor 50 when the GPS signal detected by the first sensor 40 is lower than the predetermined threshold. The predetermined threshold may include the signal strength where the signal strength of the GPS signal is zero, and a situation where the first sensor 40 still able to detect the GPS signal.

Referring to FIG. 3, the predetermined timing T may be, for example, when a distance from the boat 100 to the berth B is less than a first predetermined distance D1, For example, the first predetermined distance may be the distance that the boat 100 must travel until the boat 100 should come to a stop to moor at the berth B, wherein the automatic docking is completed.

Referring to FIG. 3, the predetermined timing T may be, for example, when a distance from the boat 100 to the pier of the berth B is less than a second predetermined distance D2.

In another embodiment of the disclosure, the predetermined timing T may be, for example, when the boat 100 is at a predetermined position relative to the roof R. The predetermined position relative to the roof R may be for example, when the boat 100 is positioned at a predetermined direction from the roof R (for example, north of the roof R, south of the roof R, south-east of the roof R, and/or the like). The position of the boat 100 relative to the roof R may be determined by using, for example, the first sensor 40 (the GPS receiver).

In another embodiment of the disclosure, the predetermined timing T may be, for example, when the boat 100 is only required to move straight forward or straight backward in order for the automatic docking to be completed. More specifically, the boat 100 is not required, to turn left or right in order for the automatic docking to be completed. That is to say, the boat 100 is located at a position relative to the berth B in which the boat only needs to move forward or rearward for the automatic docking to be completed.

It should be noted, the predetermined timing T may include a combination of the above described examples of the predetermined timing T. However, the disclosure is not limited thereto, and other predetermined timings T may be set according to requirements.

After the control unit 10 switches, at the predetermined timing T, from the first sensor to the second sensor 50 for determining the position of the boat 100, the control unit continues the automatic docking of the boat 100 by using the second sensor 50 to detect the position of the boat 100. In other words, the control unit 10 may determine the automatic docking of the boat 100 to the berth B is complete after the control unit 10 switches to the second sensor 50 for determining the position of the boat 100. In other words, when the control unit 10 detects the berth B includes the roof R, the control unit 10 will not determine the automatic docking of the boat 100 is completed until the control unit 10 switches from the first sensor 40 to the second sensor 50 for determining the position of the boat 100.

Figure 4:
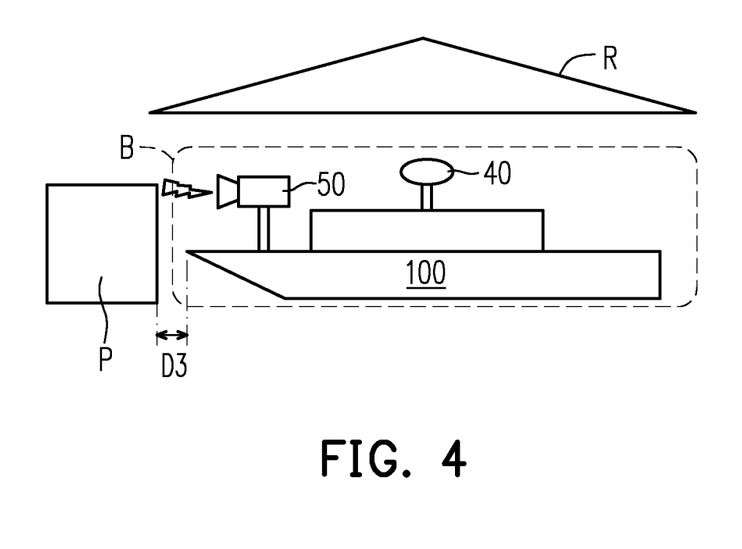
FIG. 4 is a schematic diagram illustrating a control unit determining automatic docking is complete according to an embodiment of the disclosure.

FIG. 4 is a schematic diagram illustrating a control unit determining automatic docking is complete according to an embodiment of the disclosure. Referring to FIG. 4, the control unit 10 may determine the automatic docking of the boat 100 to the berth B is complete based on the position of the boat 100 detected by the second sensor 50. For example, when a distance between the boat 100 and the pier P of the berth B detected by the second sensor 50 is equal to or less than a third predetermined distance D3, the control unit 10 may determine the automatic docking of the boat 100 to the berth B is complete. The third predetermined distance D3 may be, for example, 1 meter, 55 centimetres, 2 feet and/or the like and is not intended to limit the disclosure. However, the disclosure is not limited thereto, and the control unit 10 may determine the automatic docking is complete according to other criteria according to requirements of the user.

Figure 5:
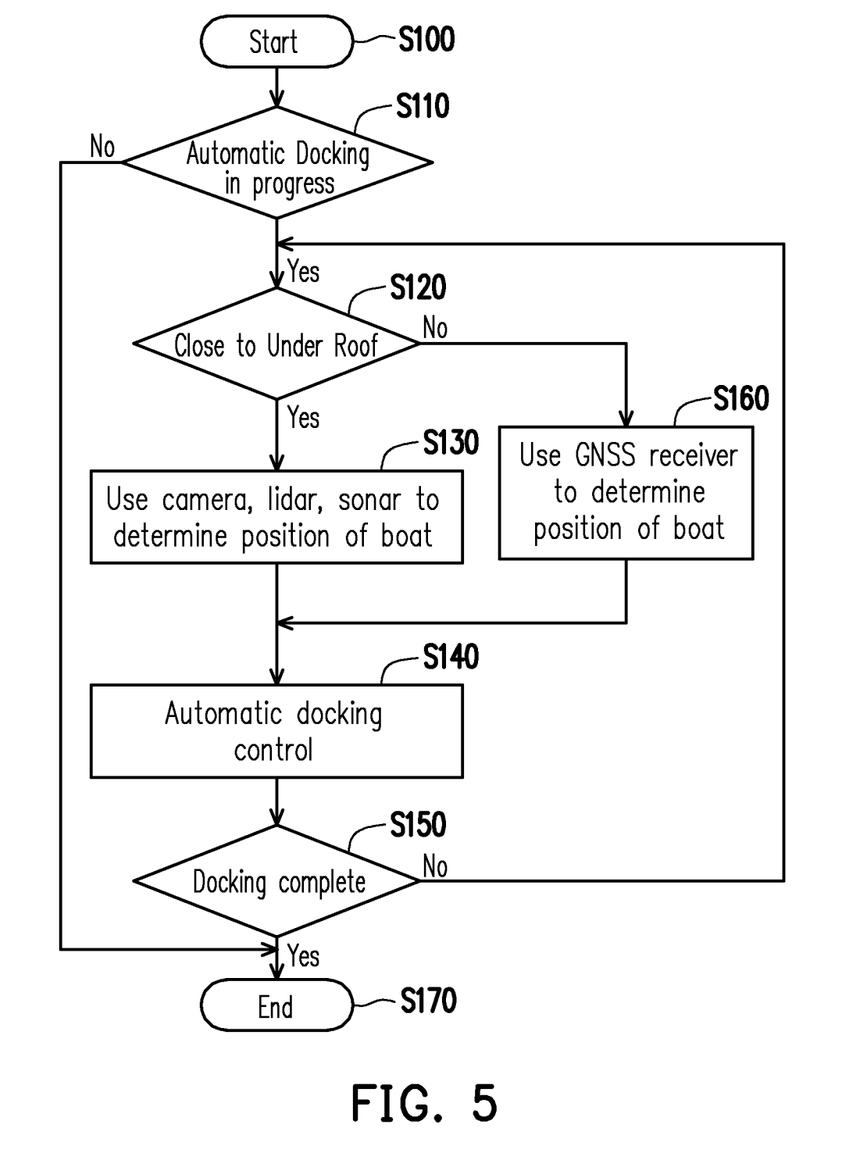
FIG. 5 is a flow chart illustrating an operation of a system for switching sensors of the boat when mooring to a berth having a roof according to an embodiment of the disclosure.

FIG. 5 is a flow chart illustrating an operation of a system for switching sensors of the boat when mooring to a berth having a roof according to an embodiment of the disclosure. Referring to FIG. 5, in step S110, the control unit 10 identifies whether automatic docking of the boat 100 to the berth B is in progress. If the control unit 10 determines automatic docking is in progress, the control unit 10 determines whether a position of the boat 100 and/or a position of the first sensor 40 is close to being under the roof R in step S120. If no, the control unit 10 uses the first sensor 40 (the GNSS receiver) to determine the position of the boat 100 in step S160. If yes, the control unit uses the second sensor (for example, the lidar, the sonar, the camera and/or the like) to determine the position of the boat 100 in step S140. After the position of the boat 100 is detected by the second sensor 50 in step S160 or the first sensor 40 in step S130, the control unit continues the automatic docking control to moor the boat 100 to the berth B in step S140, using the first sensor 40 or the second sensor 50 to determine the position of the boat 100. Next, in step S150, the control unit 10 detects whether automatic docking of the boat 100 to the berth B is completed.

It should be noted the control unit 10 may switch from the first sensor 40 to the second sensor 50 for determining the position of the boat 100 in both the manual driving mode and the automatic driving mode.

Furthermore, when the boat 100 is departing from the berth B, the control unit may use the second sensor 50 for determining the position of the boat 100, and then switch from the second sensor 50 to the first sensor 40 for determining the position of the boat 100. That is to say, the control unit 10 is configured to switch, at a second predetermined timing T2, from the second sensor 50 to the first sensor 40 for determining the position of the boat. By switching from the second sensor 50 to the first sensor 40 when the berth B for mooring the boat 100 includes the roof R, a situation where the GPS signal is cut off and/or weakened may be prevented. In this way, by using the second sensor 50 before switching to the first sensor 40, the control unit 10 may consistently and accurately detect the position of the boat 100 for the entirety of departing from the pier P even when the GPS signal obtained by the first sensor 40 is cut off and/or weakened by the presence of the roof R.

The second predetermined timing 12 may be, for example, after the first sensor 40 moves out from under the roof R.

In another embodiment of the disclosure, the second predetermined timing T2 may be, for example, when a signal strength of the GPS signal detected/obtained by the first GPS receiver is greater than a predetermined threshold. The predetermined threshold for the signal strength is greater than zero (for example, GPS signal is not cut off).

In another embodiment of the disclosure, the second predetermined timing T2 may be, for example, when a distance from the boat 100 to the berth B is greater than a predetermined distance. In another example, the second predetermined timing T2 may be, for example, when a distance from the boat 100 to the pier of the berth B is greater than a predetermined distance.

In another embodiment of the disclosure, the second predetermined timing T2 may be, for example, when the boat 100 is at a predetermined position relative to the roof R. The predetermined position relative to the roof R may be for example, when the boat 100 is positioned at a predetermined direction from the roof R (for example, north of the roof R, south of the roof R, south-east of the roof R, and the like). The position of the boat 100 relative to the roof R may be determined by using, for example, the second sensor 50.

In another embodiment of the disclosure, the second predetermined timing T2 may be, for example, when the boat 100 is required to make a turn.

It should be noted, the second predetermined timing T2 may include a combination of the above described examples of the second predetermined timing T2. However, the disclosure is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control system, adapted for a boat having a first sensor including a GNSS receiver detecting a position of the boat, and a second sensor detecting the position of the boat, the control system comprising:
   a control unit, comprising a processor, configured to:
   switch a control mode of the control unit to an automatic docking mode;
   obtain roof information regarding whether a roof is disposed on top of a berth where the boat is to be moored at a pier;

wherein when the control unit determines the roof is disposed on top of the berth where the boat is to be moored at the pier based on the roof information, the control unit is configured to switch, at a predetermined timing, from the first sensor to the second sensor for determining the position of the boat, wherein the predetermined timing is when a distance from the boat to the berth is less than a predetermined distance, wherein in response to the control unit determining the roof is not disposed on top of the berth where the boat is to be moored at the pier based on the roof information, the control unit is configured to complete docking of the boat using the first sensor, wherein in response to the control unit determining the roof is disposed on top of the berth where the boat is to be moored at the pier based on the roof information, the control unit is configured to complete docking of the boat using the second sensor, and the control unit is configured to complete docking of the boat to the berth at a determined mooring position.

2. The control system according to claim 1, wherein the roof information is obtained from a camera, and the control unit determines if the berth includes the roof from an image imaged by the camera.

3. The control system according to claim 1, wherein the roof information is obtained from map data including the roof information.

4. The control system according to claim 1, wherein the roof information is obtained from a marker specifying the roof.

5. The control system according to claim 1, wherein the roof information is obtained from a user inputting the roof information to the control unit.

6. The control system according to claim 1, wherein the roof information is obtained from a satellite image.

7. The control system according to claim 1, wherein the second sensor is a lidar.

8. The control system according to claim 1, wherein the second sensor is a sonar.

9. The control system according to claim 1, wherein the second sensor is a camera.

10. The boat, comprising:
the first sensor including the GNSS receiver detecting the position of the boat,
the second sensor detecting the position of the boat, and
the control system according to claim 1.

11. A control system, adapted for a boat having a first sensor including a GNSS receiver detecting a position of the boat, and a second sensor detecting the position of the boat, the control system comprising:
a control unit, comprising a processor, configured to:
switch a control mode of the control unit to an automatic docking mode;
obtain roof information regarding whether a roof is disposed on top of a berth where the boat is to be moored at a pier;
wherein when the control unit determines the roof is disposed on top of the berth where the boat is to be moored at the pier based on the roof information, the control unit is configured to switch, at a predetermined timing, from the first sensor to the second sensor for determining the position of the boat, wherein the predetermined timing is when a signal strength of a GNSS signal obtained by the first sensor is less than a predetermined threshold, wherein in response to the control unit determining the roof is not disposed on top of the berth where the boat is to be moored at the pier based on the roof information, the control unit is configured to complete docking of the boat using the first sensor, wherein in response to the control unit determining the roof is disposed on top of the berth where the boat is to be moored at the pier based on the roof information, the control unit is configured to complete docking of the boat using the second sensor, and the control unit is configured to complete docking of the boat to the berth at a determined mooring position.

12. A control system, adapted for a boat having a first sensor including a GNSS receiver detecting a position of the boat, and a second sensor detecting the position of the boat, the control system comprising:
a control unit, comprising a processor, configured to:
switch a control mode of the control unit to an automatic docking mode;
obtain roof information regarding whether a roof is disposed on top of a berth where the boat is to be moored at a pier;
wherein when the control unit determines the roof is disposed on top of the berth where the boat is to be moored at the pier based on the roof information, the control unit is configured to switch, at a predetermined timing, from the first sensor to the second sensor for determining the position of the boat, wherein the predetermined timing is when the boat is at a predetermined position relative to the roof, wherein in response to the control unit determining the roof is not disposed on top of the berth where the boat is to be moored at the pier based on the roof information, the control unit is configured to complete docking of the boat using the first sensor, wherein in response to the control unit determining the roof is disposed on top of the berth where the boat is to be moored at the pier based on the roof information, the control unit is configured to complete docking of the boat using the second sensor, and the control unit is configured to complete docking of the boat to the berth at a determined mooring position.

13. The control system according to claim 12, wherein the predetermined position relative to the roof includes when the boat is positioned at a predetermined direction relative to the roof.

14. The control system according to claim 12, wherein the predetermined position is before the first sensor of the boat enters under the roof.

15. The control system according to claim 12, wherein the predetermined timing is when the boat is only required to move straight forward or straight backward in order for the automatic docking to be completed.

16. The control system according to claim 12, wherein the control unit is configured to determine the position of the boat relative to the roof.

17. The control system according to claim 16, wherein the control unit is configured to switch from the first sensor to the second sensor during the automatic docking mode at the predetermined timing when the boat is located north of the roof.

* * * * *